(12) United States Patent
Jones et al.

(10) Patent No.: US 8,666,893 B1
(45) Date of Patent: Mar. 4, 2014

(54) ELECTRONIC FUNDS TRANSFER AUTHENTICATION SYSTEM

(75) Inventors: Spencer A. Jones, Charlotte, NC (US); Peter M. Berbee, Charlotte, NC (US); Stephen T. Shannon, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 566 days.

(21) Appl. No.: 12/348,376

(22) Filed: Jan. 5, 2009

(51) Int. Cl.
*G06Q 40/00* (2012.01)

(52) U.S. Cl.
USPC .............................................. 705/44; 705/38

(58) Field of Classification Search
USPC ...................... 705/44, 38, 67; 235/379; 726/7
See application file for complete search history.

(56) References Cited

U.S. PATENT DOCUMENTS

| | | | |
|---|---|---|---|
| 5,724,424 A | 3/1998 | Gifford | |
| 6,108,642 A | 8/2000 | Findley | |
| 7,668,782 B1 | 2/2010 | Reistad et al. | |
| 8,229,844 B2 | 7/2012 | Felger | |
| 2004/0254890 A1* | 12/2004 | Sancho et al. | 705/67 |
| 2007/0203826 A1* | 8/2007 | Russell et al. | 705/38 |
| 2008/0011824 A1* | 1/2008 | Swift et al. | 235/379 |
| 2009/0089869 A1* | 4/2009 | Varghese | 726/7 |
| 2012/0221470 A1* | 8/2012 | Lyon | 705/44 |

\* cited by examiner

*Primary Examiner* — Samica L Norman
(74) *Attorney, Agent, or Firm* — Michael A. Springs; Moore & Van Allen, PLLC; Andrew D. Gerschutz

(57) ABSTRACT

Embodiments of the present invention are directed to an electronic funds transfer authentication system and method to facilitate the verification and authentication of a user and the ownership of the source account from which funds are being transferred to another account. The user and transfer data is validated, and then the electronic funds transfer is validated using payment analytics that analyze the behavioral characteristics of the user which may be derived from both internal and external sources of information. Using a unique combination of security measures and procedures, the risk associated with various types of fund transfers is reduced, thereby enabling a financial institution to protect its customers' accounts with a greater degree of certainty.

18 Claims, 3 Drawing Sheets

ELECTRONIC FUNDS TRANSFER AUTHENTICATION SYSTEM

BACKGROUND

There are many different types of transfer systems available today that allow a customer to electronically transfer funds from one account to another. For example, a customer may transfer funds from an account by initiating an Automated Clearing House (ACH) transaction on an ACH platform, or they can transfer funds by means of a wire transfer using another platform. One of the key concerns, however, is whether the user accessing the transfer system is in fact the owner of the source account from which the funds are being transferred, and this determination may be even more difficult depending on the transfer system being used. To address this concern, various security measures are taken by financial institutions to detect and prevent false transactions. However, the security measures may slow down or restrict the fast, real-time movement of funds from one account to another.

What is needed is an electronic funds transfer authentication system that will expeditiously provide a greater level of certainty regarding the user's ownership of the source account to enable the fast movement of funds between accounts. The authentication system will also facilitate the integration of various transfer systems where the ownership of an account may have been more difficult to ascertain, thereby enabling a customer to easily transfer funds from one account to another using a variety of transfer methods accessible through one simplified online interface.

SUMMARY

Embodiments of the present invention are directed to an electronic funds transfer authentication system and method to facilitate the verification and authentication of a user and the ownership of the source account from which funds are being transferred to another account. The user and transfer data is validated, and then the electronic funds transfer is validated using payment analytics that analyze the behavioral characteristics of the user which may be derived from both internal and external sources of information. Using a unique combination of security measures and procedures, the risk associated with various types of fund transfers is reduced, thereby enabling a financial institution to protect its customers' accounts with a greater degree of certainty.

In some embodiments, the user uses a computer system to initiate the electronic funds transfer. The identification of the user is validated using user name analytics that may include authenticating the user's ID and password. The device fingerprint for the computer system is then validated prior to validating the transaction data related to the electronic funds transfer. The device fingerprint and transaction data may be validated by comparing the information to one or more files that contain information related to false transactions. The electronic funds transfer is then authenticated by validating the transfer using payment analytics that may include comparing various behavioral characteristics of the user to a file containing similar information related to false transactions. Embodiments of the present invention may also include validating a security code that is provided to the user electronically to authenticate the electronic funds transfer.

In exemplary embodiments of the invention, a system implementing the invention includes an input system configured to allow a user to initiate the electronic funds transfer. The system also includes a processing system connected to the input system that is configured to validate the identification of the user using user name analytics, to validate a device fingerprint for the input system, to validate transaction data related to the electronic funds transfer, and to validate the electronic funds transfer using payment analytics.

DESCRIPTION

Figure 1:
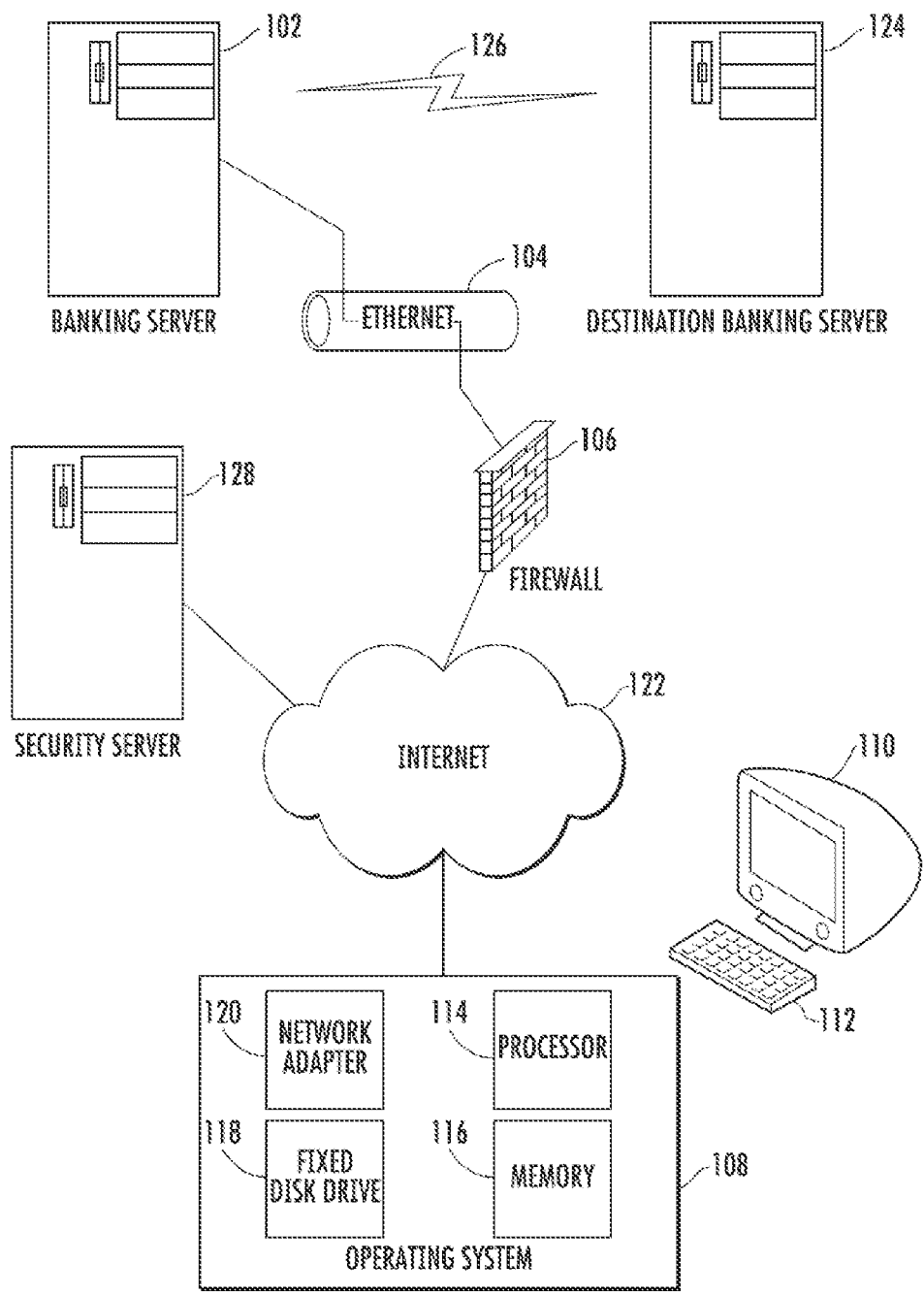
FIG. 1 is a system block diagram of one embodiment of the electronic funds transfer authentication system.

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-usable storage medium having computer-usable program code embodied in the medium.

Any suitable computer-usable or computer-readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber cable, radio frequency (RF), or other means.

Computer program code for carrying out operations of the present invention may be written in an object-oriented, scripted, or unscripted programming language such as Java, Perl, Smalltalk, C++ or the like. However, the computer program code for carrying out operations of the present invention may also be written in conventional procedural programming languages, such as the "C" programming language or similar programming languages.

Embodiments of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process, such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

The term "bank" and any similar terms are used herein in their broadest sense. Financial institutions that process transactions of the types discussed can include credit unions, savings and loan associations, stock brokerages, asset management firms, and other types of institutions which are not strictly banks in the historical sense. Retail, wholesale, and service businesses, as well as manufacturers, may also process transactions as disclosed herein. The use of terms such as "bank" or "institution" herein is meant to encompass all such possibilities.

For purposes of an example relative to the embodiments of the invention presented herein, it can be assumed that the account being discussed is an online banking account at a financial institution. However, it cannot be overemphasized that embodiments of the invention could apply to any form of e-commerce, including stock trading, retail, online auctions, etc. Basically, embodiments of the invention could find use in any environment where users access an account of any kind online and transfer funds or make payments to another account. The term "account" is used herein in its broadest sense. Institutions, organizations, and corporations that maintain various types of accounts are widely varied in their organization and structure, as well as are the accounts themselves. These terms are intended to encompass all possibilities, including, but not limited to, banks, credit unions, savings and loan associations, stock brokerages, asset management firms, finance companies, credit card companies, utility companies, mortgage companies, manufacturers, retail establishments, download services, and online auctions.

FIG. 1 illustrates a system block diagram of one embodiment of the electronic funds transfer authentication system. Banking server 102 is an online financial transaction server. The banking server 102 carries out the task of presenting the user interface to customers, gathering customer input for a funds transfer, implementing security measures and procedures, and processing the funds transfer. The banking server 102 may be referred to in this embodiment as the "processing system" of the invention. The banking server 102 is connected via an Ethernet local area network (LAN), 104. As is the case with most businesses, these resources are located behind an Internet firewall, 106. Computer program instructions to implement the various functions of embodiments of the invention reside partly in the memory of banking server 102 when it is in operation. When the system is not in operation, the instructions typically reside on a fixed magnetic disk (not shown). The computer program instructions may also be stored on portable media such as a CD-ROM, tape cartridge, or removable magnetic disk.

A customer computer system, 108, is represented in FIG. 1 by a conceptual block diagram. Such a computer system is typically connected to peripherals such as display 110 and keyboard 112. The processing platform includes one or more processors, 114, a certain amount of memory, 116, and a fixed disk drive, 118. The customer computer system 108 accesses the bank's servers via the Internet, 122, using a network adapter, 120. When the customer computer system 108 is operating, computer program instructions, such as the operating system, are partially loaded into memory 116 and are executed by processor 114. The keyboard 112 receives user input and may be referred to herein as the "input system" of the customer computer system 108.

It should be noted that the customer computer system 108 of FIG. 1 is meant as an example only. Numerous types of general-purpose computer systems and other similar devices are available and can be used.

A user enters input into the customer computer system 108 using the keyboard 112. The input is processed and communicated to banking server 102 via the Internet 122 using a web-based interface. In this embodiment of the invention, the input includes data related to a source account, a destination account, an amount of funds, and a transfer date. The source and destination accounts may be checking accounts, savings accounts, money market accounts, investment accounts, or other similar types of accounts. The input is received and processed by the banking server 102 in order to initiate an electronic transfer of funds from the source account to the destination account. The amount of funds input by the user may be transferred from the source account to the destination account using any number of electronic transfer methods as would be known and easily understood by one skilled in the art, such as a wire transfer or an ACH transaction. Typically, a user would have to access multiple platforms in order to transfer funds using various electronic transfer methods; however, U.S. patent application Ser. No. 12/260,161, which is incorporated herein by reference, discloses an integrated electronic funds transfer system that enables a user to transfer funds from one account to another using one or more electronic transfer methods through one simplified interface.

After the electronic transfer method is determined, an electronic funds transfer, 126, is initiated with a destination banking server, 124, and the amount of funds is transferred from the source account to the destination account on the transfer date. As would be easily understood by one skilled in the art, banking server 102 would have the ability to access and deduct, or cause another computer system to access and deduct, the amount of funds from the source account, which may be at the bank or another institution. Similarly, destination banking server 124 would have the ability to access and deposit, or cause another computer system to access and deposit, the amount of funds into the destination account, which may be at the destination bank or another institution.

Figure 2A:
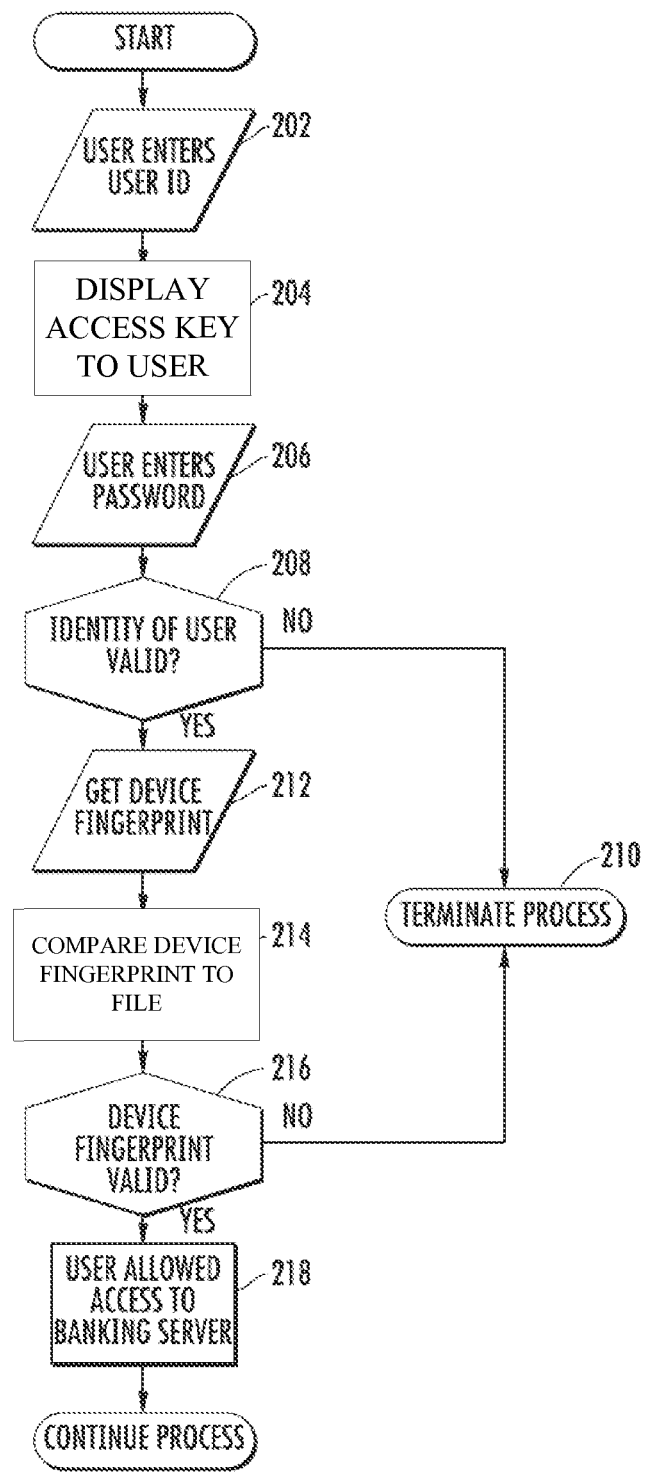
FIGS. 2A and 2B are flowchart diagrams illustrating one embodiment of the authentication process for performing the present invention.
Figure 2B:
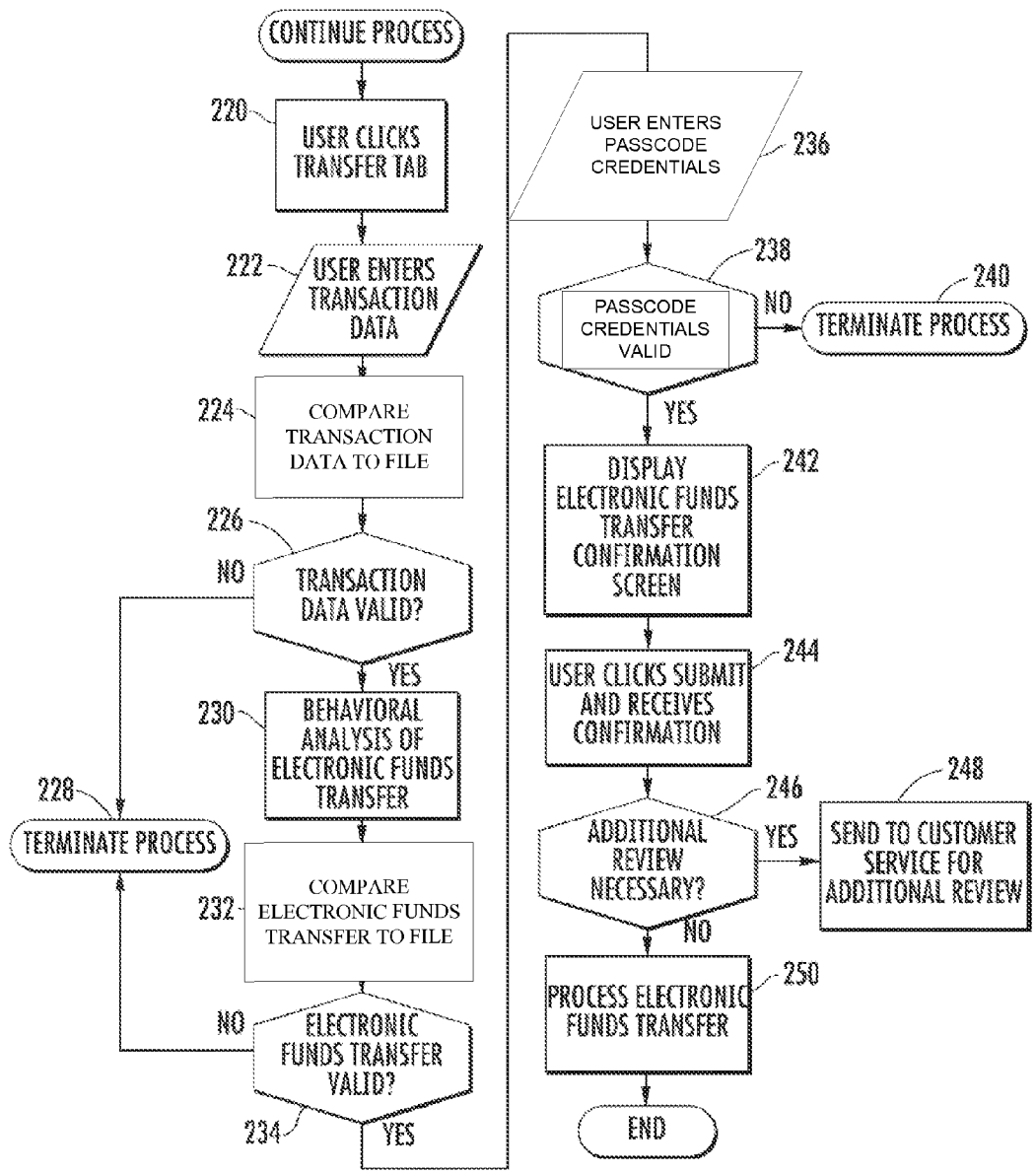

As discussed previously, security measures are necessary to determine with a greater level of certainty that the user accessing banking server 102 through customer computer system 108 is the owner of the source account from which the funds are being transferred. These security measures are also necessary to facilitate the bank's detection and prevention of false transactions. In this embodiment of the invention, various security, authentication, and verification methods and procedures, which are described below in connection with FIGS. 2A and 2B, are used in connection with a funds transfer to help reduce the risk associated with such transactions and to detect and prevent malfeasance. In embodiments of the present invention, computer program instructions that reside partly in the memory of banking server 102 are used to implement these methods and procedures. Banking server 102 may utilize a security server, 128, to access and retrieve information regarding various false transactions and activities. Some or all of the security, authentication, and verification methods and procedures may also be implemented on security server 128. Banking server 102 may access security server 128 via the Internet 122. Alternatively, security server 128 may be connected to the Ethernet LAN 104 for direct access by banking server 102. The security server 128 may be owned and operated by the bank, or the bank may use the services and/or resources of an outside vendor.

As would be known and easily understood by one skilled in the art, multiple security servers may be employed by the bank to implement various aspects of the invention. Therefore, the present invention is not limited to the specific embodiments of the electronic funds transfer authentication system described herein. Banking server 102, destination banking server 124, and security server 128 are each shown in this example as being implemented on a single hardware platform; however, they could just as easily be implemented on separate or multiple hardware platforms.

FIGS. 2A and 2B are flowchart diagrams illustrating one embodiment of the authentication process for performing the present invention. The process begins in FIG. 2A at block 202 when the user enters a user ID to access an online banking system such as an electronic funds transfer system. After the user ID is entered, an access key is displayed to the user at block 204 to provide an additional layer of identity protection to the initial sign-in process. An access key is a shared secret between the bank and the user in the form of an image and image title that the user selects and creates the first time the user accesses the system. The access key is used by the bank to identify its online banking system to the user. If the image and image title previously selected by the user are properly displayed, the user may then enter the user's password at block 206. The user's identity is validated at block 208 using user name analytics to authenticate the user's ID and password. If the user's identity is not valid, the process will terminate at block 210. If the user's identity is valid, the process continues at block 212 where the fingerprint of the user's computer is retrieved to identify the device to the online banking system.

Device recognition in the form of cookies, flash shared objects, and basic device forensics may be used to determine if the user's computer is one that the bank has authenticated before to access the online banking system. If the device is not recognized or there is an added measure of risk on the device, the user may be prompted to respond to one or more challenge questions or to enter a one-time passcode in order to authenticate the device. A device fingerprint is used to uniquely identify a computing device. Each computing device that connects to a network has a variety of parameters that can be captured and analyzed, such as the network address, operating system, or application being used to access the network. The large number of different possible parameter combinations lead to the uniqueness of individual device fingerprints. The device fingerprint is a score that is created and is based on the uniqueness of the device as derived from an evaluation of various device parameters.

After the device fingerprint has been retrieved, the process continues at block 214 where the device fingerprint is compared to a file. A file is a database that may contain information related to various false transactions and/or activities. Files may be maintained by the bank or an outside vendor, and the database may be stored on a banking server or security server as discussed in FIG. 1 above. In this example, the device fingerprint of the user's computer would be compared to a file containing the device fingerprints of computers that may have been used in connection with various false transactions. As the process continues at block 216, if the device fingerprint of the user's computer is in the file, the device fingerprint is not valid, and the process may be terminated at block 210. If the device fingerprint is valid, the user is allowed access to the online banking system through the banking server at block 218.

After the user is allowed access to the online banking system, the user then clicks the transfer tab at block 220 as shown in FIG. 2B to initiate an electronic funds transfer. The user enters input in the form of transaction data regarding the electronic funds transfer at block 222. The transaction data may include, among other things, information regarding the source account, destination account, account holder(s), amount of funds to be transferred, and the date upon which the funds are to be transferred from the source account to the destination account. Some or all of the transaction data and account information is then compared at block 224 to a file that may contain information related to various false transactions and/or activities. As the process continues at block 226, if the transaction data is in the file, the data is not valid, and the process may be terminated at block 228. If the transaction data is valid, the process continues at block 230.

The electronic funds transfer is validated next at block 230 using payment analytics that may include real-time, near real-time, or forensic analysis of the user's behavioral characteristics using information that may be derived from internal and/or external sources. Any number of characteristics based on the user's attributes and/or behavior may be reviewed and/or analyzed by a malfeasance detection engine to detect irregularities such as the length of the relationship between the bank and the user, the source and destination accounts involved, the dollar amount of the transaction, the transaction history of the account, or the current status of the account. The behavioral characteristics of the user are then compared at block 232 to a file that may contain information related to various false transactions and/or activities. In embodiments of the present invention, if irregularities are detected at block 230 or the behavioral characteristics of the user are in the file at block 232, the electronic funds transfer is not valid, and the process may be terminated at block 228. If no irregularities are detected or the behavioral characteristics of the user are valid, the process continues at block 236.

Because of the high-risk nature of wire transfers, additional security procedures may be used to validate a wire transfer using wire payment analytics, and the wire payment analytics may include, among other things, using a malfeasance detection engine to analyze the origination and destination information along with other wire specific information, or comparing the wire transfer to a file that may contain information related to various false transactions and/or activities.

In this embodiment of the invention, the user is next prompted for the user's SafePass™ credentials at block 236. SafePass is an additional authentication procedure that may be used to authorize certain high-risk transactions when using an online banking system, such as, for example, transactions over a predetermined dollar amount. A user is provided with a security code that may be used to authenticate an electronic funds transfer. The security code may also be referred to as a one-time passcode that is randomly generated when requested, and it expires after a predetermined period of time. The security code may be provided electronically when a user clicks a button on their computer to send a SafePass code via a text message to the user's mobile phone. The user may also obtain a SafePass code by pressing a button on a SafePass card that will display a new code in a window on the card each time the button is pressed. As one of ordinary skill in the art would easily recognize, numerous methods may be used to electronically send a security code to a user; therefore, the present invention is not limited to the specific embodiments of electronically providing a security code to the user as described herein. The user then enters the SafePass code, and if the SafePass code is valid at block 238, the process continues at block 242. If the SafePass code is not valid, the process may be terminated at block 240.

The user is next provided with a confirmation screen at block 242 that provides a detailed summary of the electronic funds transfer requested by the user. If the details are correct, the user clicks the submit button at block 244 and is then provided with a confirmation receipt. At various points in the authentication process, determinations are made regarding the validity of various information in order for the automated process to continue. For the purpose of illustration, if the information was not valid, the process described above was terminated. However, as would be easily understood by one skilled in the art, any number of options may be available if the information is not determined to be valid. For example, various factors and combinations of factors may be considered at each decision point that may result in different actions being taken. Instead of the process being terminated, the transaction may be analyzed and scored, and as a result of the score, the transaction may be flagged for a customer service representative to review and take action or allow the transaction to continue. This review could take place at any point in the process. For the purpose of illustration, the transaction is reviewed at block 246 to determine if any additional review is necessary. If an additional review is necessary, the transaction is sent to customer service at block 248 for review. If no additional review is necessary, the electronic funds transfer is processed at block 250.

Alerts are an additional security feature that may be utilized by a bank to notify customers of potential false activity. Alerts are convenient and easy to use. They provide timely notifications to customers on critical transactions, and they send reports to the customer when the customer's information or credentials have changed. Customers who respond to alerts are "first responders" to questionable activity that notifies the bank when a potential malfeasance has occurred.

Note that the present invention is not limited to the embodiment of the funds transfer and authentication process described above. The exact process may vary depending on the computer system and/or network that is used. As one of ordinary skill in the financial and computing arts would quickly recognize, the steps described above for the funds transfer and authentication process may vary, be ordered differently, or involve additional steps not disclosed herein, and that the present invention is not limited to the above process.

The terminology used herein is for the purpose of describing particular embodiments only and is not intended to limit the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Additionally, comparative, quantitative terms such as "above," "below," "less," and "greater," are intended to encompass the concept of equality; thus, "less" can mean not only "less" in the strictest mathematical sense, but also "less than or equal to."

Although specific embodiments have been illustrated and described herein, those of ordinary skill in the art will appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

We claim:

1. A computer-implemented method of authenticating an electronic funds transfer, the method comprising:
   receiving a username from a user;
   displaying an image and image title to the user, wherein the image and image title are stored in a database in association with the username;
   receiving a password from the user in response to displaying the image and the image title;
   determining that the user is authorized to initiate an electronic funds transfer based on the username and password;
   determining a network address and an operating system of a computer system being used by the user:
   validating a device fingerprint for the computer system, wherein the device fingerprint is a score created based at least in part on the network address and the operating system;
   comparing the device fingerprint to a file comprising device fingerprints of a plurality of computer systems that may have been used in connection with fraudulent transactions;
   receiving data from the user related to an electronic funds transfer, the data comprising a source account, a destination account, an amount of funds, and a transfer date;
   validating transaction data related to the electronic funds transfer, wherein validating transaction data related to the electronic funds transfer comprises comparing the transaction data to at least one file containing characteristics of transaction data associated with false transactions; and
   validating the electronic funds transfer using payment analytics wherein validating the electronic funds transfer using payment analytics comprises comparing the behavioral characteristics of the user to at least one file containing behavioral characteristics associated with false transactions, wherein the behavioral characteristics are selected from the group consisting of the length of the relationship between a bank associated with a source account for the electronic funds transfer, a transaction history of the source account, and a current status of the source account.

2. The method of claim 1 wherein the validation of the device fingerprint comprises comparing the device fingerprint to at least one file containing information related to devices associated with at least one false transaction.

3. The method of claim 1 wherein the behavioral characteristics of the user are derived at least in part from internal and external sources of information.

4. The method of claim 1 further comprising validating a security code electronically provided to the user to authenticate the electronic funds transfer.

5. The method of claim 1 further comprising validating a wire transfer using wire payment analytics.

6. The method of claim 5 wherein the validation of the wire transfer using wire payment analytics comprises comparing the wire transfer to at least one file containing information related to wire transfers associated with at least one false transaction.

7. The method of claim 1 wherein the user is using the computer system to request access to a remotely located device through a web-based interface.

8. A computer-readable non-transitory medium having computer program code embodied thereon, the computer program code for authenticating an electronic funds transfer, the computer program code comprising:
    instructions for receiving a username from a user;
    instructions for displaying an image and image title to the user, wherein the image and image title are stored in a database in association with the username;
    instructions for receiving a password from the user in response to displaying the image and the image title;
    instructions for determining that the user is authorized to initiate an electronic funds transfer based on the username and password;
    instructions for determining a network address and an operating system of a computer system being used by the user;
    instructions for validating a device fingerprint for the computer system, wherein the device fingerprint is a score created based at least in part on the network address and the operating system;
    instructions for comparing the device fingerprint to a file comprising device fingerprints of a plurality of computer systems that may have been used in connection with fraudulent transactions;
    instructions for receiving data from the user related to an electronic funds transfer, the data comprising a source account, a destination account, an amount of funds, and a transfer date;
    instructions for validating transaction data related to the electronic funds transfer, wherein validating transaction data related to the electronic funds transfer comprises comparing the transaction data to at least one file containing characteristics of transaction data associated with false transactions; and
    instructions for validating the electronic funds transfer using payment analytics, wherein validating the electronic funds transfer using payment analytics comprises comparing the behavioral characteristics of the user to at least one file containing behavioral characteristics associated with false transactions, wherein the behavioral characteristics are selected from the group consisting of the length of the relationship between a bank associated with a source account for the electronic funds transfer, a transaction history of the source account, and a current status of the source account.

9. The computer-readable medium of claim 8 wherein the validation of the device fingerprint comprises comparing the device fingerprint to at least one file containing information related to devices associated with at least one false transaction.

10. The computer-readable medium of claim 8 wherein the validation of the electronic funds transfer using payment analytics comprises analyzing behavioral characteristics of the user.

11. The computer-readable medium of claim 10 wherein the behavioral characteristics of the user are derived at least in part from internal and external sources of information.

12. The computer-readable medium of claim 8 wherein the computer program code further comprises instructions for validating a security code electronically provided to the user to authenticate the electronic funds transfer.

13. The computer-readable medium of claim 8 wherein the computer program code further comprises instructions for validating a wire transfer using wire payment analytics.

14. The computer-readable medium of claim 13 wherein the validation of the wire transfer using wire payment analytics comprises comparing the wire transfer to at least one file containing information related to wire transfers associated with at least one false transaction.

15. The computer-readable medium of claim 8 wherein the user is using the computer system to request access to a remotely located device through a web-based interface.

16. A system for authenticating an electronic funds transfer, the system comprising:
    an input system configured to allow a user to initiate the electronic funds transfer; and
    a processing system in communication with the input system and configured to:
    validate the identification of the user using user name analytics,
    determine a network address and an operating system of a computer system being used by the user,
    validate a device fingerprint, wherein the device fingerprint is a score created based at least in part on the network address and the operating system for the input system,
    compare the device fingerprint to a file comprising device fingerprints of a plurality of computer systems that may have been used in connection with fraudulent transactions,
    receive data from the user related to an electronic funds transfer, the data comprising a source account, a destination account, an amount of funds, and a transfer date;
    validate transaction data related to the electronic funds transfer comprising comparing the transaction data to at least one file containing characteristics of transaction data associated with false transactions, and
    validate the electronic funds transfer using payment analytics comprising comparing the behavioral characteristics of the user to at least one file containing behavioral characteristics associated with false transactions, wherein the behavioral characteristics are selected from the group consisting of the length of the relationship between a bank associated with a source account for the electronic funds transfer, a transaction history of the source account, and a current status of the source account.

17. The system of claim 16 wherein the processing system is further configured to validate a security code electronically provided to the user to authenticate the electronic funds transfer.

18. The system of claim 16 wherein the processing system is further configured to validate a wire transfer using wire payment analytics.

* * * * *